Oct. 13, 1936.  O. W. LIVINGSTON  2,057,531
ELECTRIC INDICATING SYSTEM
Filed Dec. 23, 1932
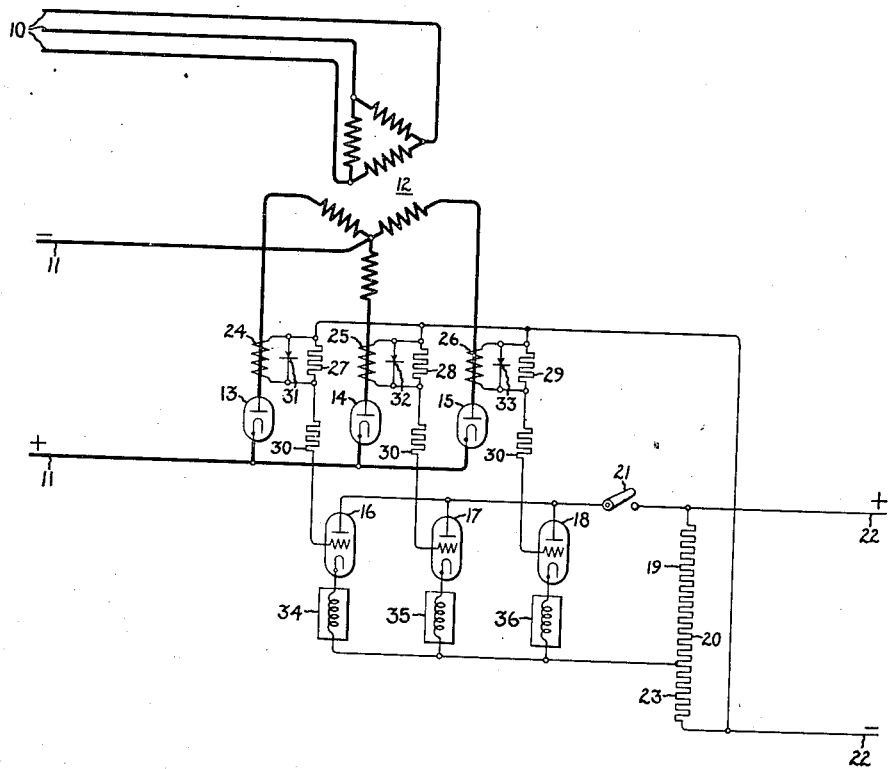
Inventor:
Orrin W. Livingston,
by Charles E. Tullar
His Attorney.

Patented Oct. 13, 1936

2,057,531

UNITED STATES PATENT OFFICE 2,057,531

ELECTRIC INDICATING SYSTEM

Orrin W. Livingston, Schenectady, N. Y., assignor to General Electric Company, a corporation of New York Application December 23, 1932, Serial No. 648,712

10 Claims. (Cl. 177—311)

My invention relates to electric indicating systems and more particularly to such systems for indicating the initial impulse from a plurality of sources of electric impulses.

It often occurs that in electric apparatus or circuits electric impulses or transients occur in different elements of the system. These impulses may be due to the same cause or to unrelated causes or, in some cases, they may be mutually inter-dependent. It is often desirable to determine which of a number of electric impulses or transients is the initial impulse, particularly in the case when these impulses are inter-related. In some instances these inter-related impulses follow one another with such rapidity that it is not possible for the physical senses or any ordinary indicating mechanism to differentiate between them. For example, in certain electric valve converting apparatus it has been found that such electric impulses may be separated by only a few micro-seconds.

It is an object of my invention, therefore, to provide an improved electric indicating system which will fulfill the above requirements and which will be simple and reliable in operation.

It is another object of my invention to provide an improved electric indicating system that will determine which of a plurality of electrical impulses occurring in rapid succession was the initial impulse.

It is a further object of my invention to provide an improved electric indicating system including an indicating device for each of a plurality of sources of electrical impulses, in which the operation of any indicating device renders the other indicating devices inoperative.

In accordance with one embodiment of my invention, there is provided an apparatus for determining which of a plurality of electric valves of an electric valve converting apparatus is first to fail; that is, in which a reverse arc first occurs. In such apparatus the failure of one of the electric valves often sets up transients in the other parts of the apparatus which causes failure of one or more of the other electric valves in rapid succession. In order to obtain an indication of which of the electric valves first failed there is provided an auxiliary electric valve for each of the main electric valves, the conductivity of each auxiliary valve being controlled by load conditions in its corresponding main electric valve. The auxiliary electric valves are interconnected with a source of current and there is provided means responsive to the initiation of current in any of the auxiliary valves for maintaining the rest of the auxiliary valves nonconductive. Thus, only a single one of the auxiliary electric valves, corresponding to the main electric valve which failed first, will become conductive, and an indication of this initial failure may be obtained from the conducting state of this auxiliary valve or auxiliary indicating apparatus may be included in the circuit with each of the auxiliary electric valves.

For a better understanding of my invention, together with other and further objects thereof, reference is had to the following description taken in connection with the accompanying drawing and its scope will be pointed out in the appended claims. The single figure of the drawing illustrates an arrangement embodying my invention for determining which of the valves of a three-phase half wave rectifier is the first to fail.

Referring now more particularly to the drawing there is illustrated an arrangement for transmitting energy from a three-phase alternating current supply circuit 10 to a direct current load circuit 11. This apparatus includes a three-phase transformer 12 provided with a primary network connected to the alternating current circuit 10 and a secondary network having an electrical neutral connected to one side of the direct current circuit 11 and end terminals connected to the other side of the direct current circuit 11 through electric valves 13, 14, and 15. Each of the electric valves 13, 14, and 15 is provided with an anode and a cathode and may be of any of the several types well known in the art. It will also be well understood that the three-phase rectifying apparatus illustrated in the drawing is merely illustrative, and that the invention is equally applicable to any type of electric valve converting apparatus either with or without grid control. There are also provided auxiliary electric valves 16, 17, and 18, associated respectively with electric valves 13, 14, and 15. Electric valves 16, 17, and 18 are each provided with an anode, a cathode and a control grid and are preferably of the vapor electric discharge type. Electric valves 16, 17, and 18 are connected in parallel across a portion 19 of a potentiometer 20 through a switch 21, while potentiometer 20 is connected across a direct current circuit 22, as illustrated. Current transformers 24, 25 and 26 are connected in the anode circuits of electric valves 13, 14, and 15, respectively, to produce potentials dependent upon the current in the respective valves, while these transformers are shunted by voltage limiting resistors 27, 28, and 29, respectively. The grids of the electric valves 16, 17, and 18 are excited with potentials across the resistors 27, 28, and 29, respectively, so that their conductivities are controlled in accordance with current conditions in their associated main electric valves 13, 14, and 15. The grid circuits of the electric valves 16, 17, and 18 have a common circuit which includes a portion 23 of the potentiometer 20, the connections being such that the potentials impressed upon the grids of the electric valves 16, 17, and 18 by the potentiometer 20 is at all times negative with respect to the cathodes of these valves. If desired, current limiting resistors 30 may be included in the grid circuits of the valves 16, 17, and 18. In case it is desired to obtain an indication only of abnormal currents of a given polarity in the valves 13, 14, and 15, unilaterally conductive devices, such as the contact rectifiers 31, 32, and 33, may be connected to substantially short circuit the series transformers 24, 25, and 26, respectively, for abnormal currents in the electric valves of the opposite polarity, or the transformers 24, 25, and 26 may be designed to be normally saturated by the unidirectional component of current flowing in the valves 13, 14, and 15. If the electric valves 16, 17, and 18 are of the vapor electric discharge type, the initiation of current in any of the electric valves gives rise to a pronounced blue glow, as is well understood by those skilled in the art. If, however, other types of valves are used, or in case an audible or remote indication is desired upon the failure of one of the main electric valves 13, 14, and 15, auxiliary indicating or alarm devices 34, 35, and 36 may be connected in series with electric valves 16, 17, and 18, respectively.

In explaining the operation of the above described apparatus, it will be assumed that electric valves 13, 14, and 15, together with the transformer 12 are operating as a half wave rectifier supplying unidirectional current to the circuit 11. It will also be assumed that the contact rectifiers 31, 32, and 33 are connected to short circuit any potentials produced in the current transformers 24, 25, and 26, respectively, by abnormally large currents in the normal direction of conduction of electric valves 13, 14, and 15, or that these transformers become saturated under normal operating conditions. It will also be assumed that the switch 21 is in its closed position. Under these conditions, the negative bias appearing across the portion 23 of the potentiometer 20 is impressed upon the grids of all of the electric valves 16, 17, and 18 and tends to maintain these valves nonconducting. If one of the main electric valves, for example, electric valve 13, should fail and a reverse current, that is, an arc back, should flow therethrough, a potential will be generated by current transformer 24 and this potential will appear across resistor 27 which is connected with such a polarity as to impress a positive impulse upon the grid of the electric valve 16. The connections to potentiometer 20 and the constants of the current transformer circuit are so chosen that when a reverse current of the desired magnitude occurs through electric valve 13, the potential appearing across the resistor 27 will be sufficient to overcome the negative bias of the portion 23 of the potentiometer 20 to render the valve 16 conductive. As stated above, if the valve 16 is of the vapor electric type, visible indications of such a failure will be obtained by the blue glow appearing in the valve 16. If, in addition, the signaling devices 34, 35, and 36 are utilized, it will be apparent that the device 34 will become energized to give any desired indication. Upon the initiation of current in the electric valve 16, the portion 19 of the potentiometer 20 is by-passed by the electric valve 16 and the indicating device 34, in case it is used. The impedance of this circuit is relatively low with respect to that of the portion 19 of the potentiometer with the result that the potential across this portion is reduced to a very small value, the greater part of the potential of the circuit 22 appearing across the portion 23 of the potentiometer. This has two effects. In the first place it reduces the anode potentials of the electric valves 17 and 18 and, in case these valves are of the vapor electric type, their anode potentials may be reduced to such a value as to be insufficient to initiate a current in them. In the second place, with substantially the full potential of the circuit 22 appearing across the portion 23 of the potentiometer 20, the negative bias on the grids of the nonconducting valves will be increased by an amount equal to the difference between the potential normally appearing across the portion 23 of the potentiometer 20 and that appearing across the portion 23 when the portion 19 is shunted by a conductive electric valve and its associated indicating means. These two effects combine to insure that after one of the auxiliary indicating valves 16, 17, or 18 is rendered conductive, the remaining valves will be maintained nonconductive even upon the occurrence of abnormal reverse current in their associated main electric valves 13, 14, or 15. It has been found that the above described apparatus will respond to the initial impulse of a train of successive impulses separated by only a few micro-seconds.

While I have described my invention as applied to an arrangement for indicating which of a plurality of electric valves of an electric valve converting apparatus is the first to fail, it will be apparent to those skilled in the art that it is in nowise limited thereto but is equally applicable to the indication of the initial impulse from a plurality of sources of electrical impulses of any type.

While I have described what I at present consider a preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. An electrical indicating system including a plurality of sources of electric impulses and means for indicating the initial impulse from said sources comprising a plurality of controlled electric valves, each associated with a different one of said sources of impulses, and means for rendering conductive only that valve associated with the source supplying the initial impulse of a series of successive impulses.

2. An electric indicating system including a plurality of sources of electric impulses and means for indicating the initial impulse from said sources comprising a controlled electric valve for each of said sources of impulses, a source of current for energizing said valves, and a circuit interconnecting said valves and including means responsive to the initiation of current in any one of said valves for maintaining the rest of said valves nonconductive.

3. An electric indicating system including a plurality of sources of electric impulses and means for indicating the initial impulse from said sources comprising a grid controlled electric valve for each of said sources of impulses and a grid circuit for each of said valves excited from its respective source of impulses, a source of current for energizing said valves, and means connected across said source of current provided with connections to said valves and said grid circuits effective in response to the initiation of current in any one of said valves to maintain a negative bias on the grids of the rest of the valves.

4. An electric indicating system including a plurality of sources of electric impulses and means for indicating the initial impulse from said sources comprising a grid-controlled electric valve for each of said sources of impulses and a grid circuit for each of said valves excited from its respective source of impulses, a source of current for energizing said valves, means connected across said source of current to provide a negative bias for said grid circuits, a portion of said means presenting an impedance which varies in response to the initiation of current in any one of said valves to increase the negative bias of the grid circuits of said valves.

5. An electric indicating system including a plurality of sources of electric impulses and means for indicating the initial impulse from said sources comprising a grid controlled electric valve for each of said sources of impulses and a grid circuit for each of said valves excited from its respective source of impulses, a source of current for supplying anode current and a negative bias potential for said grid circuits of an amplitude less than that of said impulses, and an impedance device connected across said source of current effective in response to the initiation of current in any one of said valves to increase the negative bias on the grids of the rest of said valves to a value greater than the amplitude of said impulses.

6. An electric indicating system including a plurality of sources of electric impulses and means for indicating the initial impulse from said sources comprising a vapor electric valve for each of said sources, each valve being provided with an anode, a cathode, and a control grid, a source of direct current, a potentiometer connected across said source, the anode-cathode circuits of said valves being connected in parallel across a portion of said potentiometer, and a grid circuit for each of said valves including one of said sources of impulses, said grid circuits having a common connection to said potentiometer at a point negative with respect to the connection of the cathodes of said valves.

7. An electric indicating system for indicating the initial failure among a plurality of main electric valves comprising an auxiliary grid controlled electric valve for each of the main electric valves, means connected to the grids of said valves for controlling the conductivity of each auxiliary valve in response to predetermined abnormal conditions in its associated main valve, a source of current for energizing said auxiliary valves, and a circuit common to all of said auxiliary valves and including means responsive to the initiation of current in any one of said auxiliary valves for maintaining the rest of said auxiliary valves nonconductive by the application of a more negative potential to said grids.

8. An electric indicating system for indicating the initial failure among a plurality of main electric valves comprising an auxiliary grid controlled electric valve for each of the main electric valves, a grid circuit for each of said auxiliary valves including means excited in response to a reverse arc in its associated main valve, a source of current for energizing said auxiliary valves, and means connected between said source of current and said auxiliary valves responsive to the initiation of current in any of said auxiliary valves for maintaining the rest of said auxiliary valves nonconductive.

9. An electric indicating system for indicating the initial failure among a plurality of main electric valves comprising an auxiliary grid controlled electric valve for each of the main electric valves, means for producing a potential variable in accordance with the current transmitted by each of said main valves, means for short circuiting each of said potentials when of a polarity corresponding to the normal conductivity of its respective valve, a grid circuit for each of said auxiliary valves including one of said potential producing means, a source of current for energizing said auxiliary valves, and means connected between said auxiliary valves and said source of current responsive to the initiation of current in any of said auxiliary valves for impressing a negative bias on the grids of the rest of said auxiliary valves.

10. An electric indicating system for indicating the initial failure among a plurality of main electric valves comprising an auxiliary grid controlled vapor electric valve for each of said main electric valves, a current transformer for each of said main valves and excited by the current therethrough, a unilaterally conductive device connected across each of said transformers to short circuit potentials produced by normal valve currents, a grid circuit for each of said auxiliary electric valves including one of said transformers, a source of current, a potentiometer connected across said source, the anode-cathode circuits of said auxiliary valves being connected in parallel across a portion of said potentiometer, and connections between said grid circuits and a common point of said potentiometer negative with respect to the connection of the cathodes of said valves.

ORRIN W. LIVINGSTON.